(12) United States Patent
Barbier et al.

(10) Patent No.: US 6,944,376 B2
(45) Date of Patent: Sep. 13, 2005

(54) OPTICAL PUMP DEVICE WITH SEVERAL OUTPUT CHANNELS AND USE OF SAME IN AN AMPLIFIER DEVICE

(75) Inventors: Denis Barbier, Grenoble (FR); Olivier Jacquin, Grenoble (FR); Engin Molva, Grenoble (FR)

(73) Assignee: Teem Photonics, Meylan (FR)

( * ) Notice: Subject to any disclaimer, the term of this patent is extended or adjusted under 35 U.S.C. 154(b) by 0 days.

(21) Appl. No.: 10/494,324

(22) PCT Filed: Nov. 4, 2002

(86) PCT No.: PCT/FR02/03767

§ 371 (c)(1),
(2), (4) Date: Apr. 30, 2004

(87) PCT Pub. No.: WO03/040765

PCT Pub. Date: May 15, 2003

(65) Prior Publication Data

US 2005/0069251 A1 Mar. 31, 2005

(30) Foreign Application Priority Data

Nov. 5, 2001 (FR) .............................. 01 14260

(51) Int. Cl.$^7$ .............................. G02B 6/42; H01S 3/093
(52) U.S. Cl. .............................. 385/48; 385/45; 372/72
(58) Field of Search .................... 385/27–28, 45–48; 372/6, 72, 96

(56) References Cited

U.S. PATENT DOCUMENTS 6,208,678 B1    3/2001 King .......................... 372/72

FOREIGN PATENT DOCUMENTS

EP          0 725 287         8/1996

OTHER PUBLICATIONS

A.E. Willner, et al., "Star couplers with gain using multiple erbium–doped fibers pumped with a single laser", IEEE Photonics Technology Letters., vol. 3, No. 3, pp. 250–252.
K. Suzuki, et al., "Miniature semiconductor optical power splitters with submicrometre wide aperture", ELectronics Letters, vol. 32, No. 7, pp. 654–655 Mar. 28, 1996.
N. A. Sanford, et al., "Y–branch waveguide glass laser and amplifier", Optics Letters, vol. 16, No. 15, pp. 1168–1170 Aug. 1, 1991.

*Primary Examiner*—Phan T. Palmer
(74) *Attorney, Agent, or Firm*—Oblon, Spivak, McClelland, Maier & Neustadt, P.C.

(57) ABSTRACT

An optical pump device including a pump source optically connected to an optical divider including one input channel and n output channels. The input channel is configured to receive a pump wave derived from the source and the n output channels are configured to output n pump waves, where n is an integer greater than 1. The pump device can be used in an optical amplification device. The device has applications in all domains in which several optical pumps are necessary, and more particularly in the domain of optical telecommunications, and for example for optical amplifiers.

13 Claims, 3 Drawing Sheets

OPTICAL PUMP DEVICE WITH SEVERAL OUTPUT CHANNELS AND USE OF SAME IN AN AMPLIFIER DEVICE

TECHNICAL DOMAIN

This invention relates to an optical pump device with several output channels and use of the pump device in an optical amplification device.

The invention is used for applications in all domains requiring several optical pumps and more particularly in the domain of optical telecommunications and for example for optical amplifiers.

STATE OF PRIOR ART

At the present time, optical systems requiring several optical pumps use independent pump sources optically connected independently to elements of the optical system.

The cost of such a system is particularly high if the number of independent pump sources is also high, and moreover the assembly is less compact and less reliable when there is a large number of independent sources.

PRESENTATION OF THE INVENTION

The purpose of this invention is to propose an optical pump device with several output channels using a single pump source.

Other purposes of the invention are to propose a compact, reliable and low cost optical pump device with several output channels.

Another purpose of the invention is to propose the use of such an optical pump device with several output channels, in an optical amplification device.

To achieve these purposes, the invention proposes an optical pump device comprising a pump source optically connected to an optical divider comprising one input channel and n output channels.

The n output channels of the divider form the n output channels from the pump device and can supply n pump waves.

The optical divider is made in integrated optics in a substrate, the input channel is an input guide, the n output channels are formed by n output guides, the input guide being connected to the n output guides by at least one optical element chosen from among an optical coupler or a Y junction.

The pump device according to the invention could be connected to at least one optical amplifier. An optical amplifier according to the invention includes any active element that could be optically pumped by pump waves.

Regardless of the type of divider used, when n>2, the divider comprises more than two optical elements such as couplers or Y junctions that are cascaded in order to obtain the n output channels.

The n output channels are either identical to enable production of a divider with n symmetrical channels, or they may be different to make a divider with n asymmetric channels.

The pump source emits a pump wave S that is input into the pump device input channel. This pump wave may have one or several wavelengths (for example usually equal to about 980 nm and/or 1480 nm when it is used in an optical amplifier doped with erbium).

The divider divides this pump wave S into several pump waves $S_1, S_2, \ldots, S_n$, these pump waves transported by the corresponding n output channels all have the same power in the case in which a symmetrical divider is used, or different powers if an asymmetric divider is used. Some output channels in an asymmetric divider may carry the same power.

An asymmetric divider can be obtained if one or several couplers are used, by varying the interaction length of at least one coupler and/or the section of the different output channels of at least one coupler.

An asymmetric divider can be obtained if one or several Y junctions are used by varying the section of the output channels of at least one junction and/or the angle between the output channels of at least one junction and the optical axis of the input channel of the junction.

According to one preferred embodiment, the divider is made in integrated optics and particularly by ion exchange techniques in glass.

The pump source of the pump device may either be connected to the input channel of the divider through an optical fibre or, when the divider is connected in integrated optics, it may be directly transferred to the substrate of the divider, or it may be made partly in the divider.

The pump source can emit a pump wave at a single wavelength or at several wavelengths.

When the pump source emits a wave with several wavelengths, it may for example include several sub-sources capable of transmitting one of the wavelengths of the source, the different sub-sources being optically connected to a multiplexing device capable of transmitting a pump wave S comprising the said wavelengths to the input channel of the pump device according to the invention.

Thus, the different sub-sources and the associated multiplexing device form a single source. When the source comprises m sub-sources, the multiplexing device outputs a pump wave with m wavelengths.

The multiplexing device comprises at least one optical element such as a coupler or a Y junction; if m>2, then the elements are cascaded.

According to one advantageous embodiment, the multiplexing device of the pump source is integrated in the same substrate as the divider, the sub-sources being transferred on the said substrate or connected to the multiplexing device through optical fibres.

Another purpose of the invention is to use the pump device in an optical amplification device comprising:
  an optical pump device comprising a pump source optically connected to an optical divider comprising one input channel and n output channels,
  at least one optical amplifier connected firstly to the pump device and secondly to a device at which a signal E to be amplified is input and a device for retrieving the amplified signal F.

The optical amplifier is either a fibre amplifier, or an amplifier in integrated optics. In the latter case, it may be made in the same substrate (which is generally doped in the amplifying part) as the pump device, or on another substrate that could be transferred, for example by gluing onto the substrate of the pump device.

According to a first embodiment of the optical amplification device, the device comprises:
  an optical pump device comprising a pump source optically connected to an optical divider comprising an input channel and two output channels,
  an optical amplifier comprising one input connected firstly to one of the output channels of the pump device, and secondly to the device used to input the signal E to be amplified and an output connected firstly to the other output channel of the pump device and secondly to the device for retrieving the amplified signal F.

The input device comprises a guide and/or a fibre, and the retrieval device comprises a multiplexer such as a coupler.

When the divider of the pump device is made in integrated optics, the device for input of the signal E to be amplified advantageously comprises a first optical guide and a first coupler formed in the same substrate as the pump device, the said coupler being formed by bringing the first optical guide and one of the output channels from the pump device towards each other, the first optical guide being capable of receiving the signal E to be amplified that is transmitted through the coupler to the said output channel from the pump device, the said channel then transporting the signal E and a part of the pump wave S to the amplifier input. Therefore, in this embodiment, the amplifier input is connected to the input device of the signal E to be amplified through one of the output channels of the pump wave.

Similarly, when the divider of the pump device is made in integrated optics, the device for retrieving the amplified signal F advantageously comprises a second optical guide and a second coupler formed in the same substrate as the pump device, the said coupler being formed by bringing the second optical guide and one of the output channels from the pump device together. In this embodiment, the signal F amplified in the amplifier is transmitted through the output channel from another part of the pump wave and the second coupler, to the second optical guide, which is capable of emitting the amplified signal F at the output. Thus, in this mode, the signal F is transported in the opposite direction to the pump wave on the output channel of the pump device, the amplifier output being connected to the device used for retrieving the amplified signal F through one of the output channels from the pump device.

The pump device according to the invention can also be used in an amplification device comprising a matrix of optical amplifiers, this amplification device comprising:

an optical pump device comprising a pump source optically connected to an optical divider comprising one input channel and n output channels, at least n/2 optical amplifiers, each amplifier comprising two ends, at least one of its ends being optically connected to one of the output channels from the pump device, one of the ends of the amplifier also being connected to a device for input of a signal to be amplified and the other end of the amplifier being connected to a device for retrieving the amplified signal.

According to a first embodiment of the amplification device, the amplification device comprises a pump device with n output channels and n optical amplifiers, one of the ends of each amplifier being connected to one of the output channels from the pump device and to a device for input of a signal to be amplified, and the other end of the amplifier being connected to a device for retrieving the amplified signal.

In this embodiment, for each amplifier, the amplified signal is retrieved directly at the output from the amplifier, the retrieval device does not include a coupler or more generally a multiplexer to retrieve the amplified signal from the pump device output channel.

On the other hand, the input device comprises a guide and/or a fibre and a multiplexer such as a coupler, as described above.

According to a second embodiment of the amplification device, the amplification device comprises a pump device with n output channels and n/2 optical amplifiers, one of the ends of the amplifier being connected to one of the output channels from the pump device and to a device for input of a signal to be amplified, and the other end of the amplifier being connected to another output channel from the pump device and to a device for retrieving the amplified signal.

In this embodiment, for each amplifier, the input device comprises a guide and/or a fibre and the retrieval device comprises a multiplexer respectively.

Other characteristics and advantages of the invention will become clearer after reading the following description, with reference to the figures in the appended drawings. This description is given purely for illustrative purposes and is in no way limitative.

DETAILED DESCRIPTION OF EMBODIMENTS OF THE INVENTION

Figure 1:
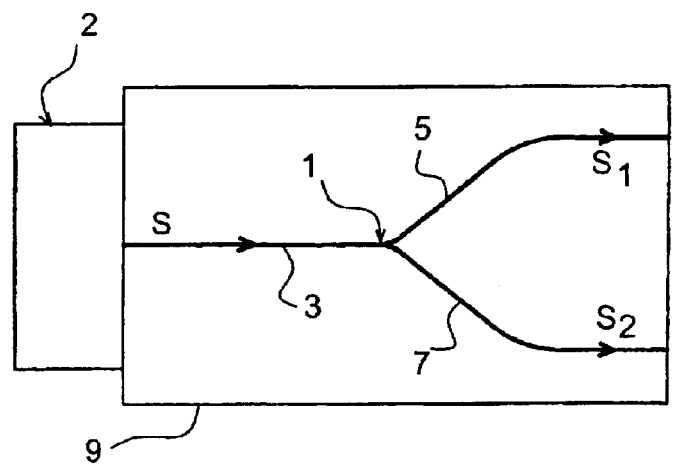
FIG. 1 diagrammatically shows a pump device according to the invention with two output channels using a divider made in integrated optics.

Thus, FIG. 1 diagrammatically shows a first example embodiment of an optical pump device according to the invention.

This device comprises a pump source 2 optically connected to an optical divider 1 comprising one input channel 3 and two output channels references 5 and 7 respectively. Channels 3, 5 and 7 are made by optical guides in this example, the divider being made by integrated optics into a substrate 9.

In general, an optical guide is composed of a central part generally called the core and surrounding media located all around the core and that may be identical to each other or different.

To enable confinement of light in the core, the refraction index of the medium making up the core must be different and in most cases greater than the corresponding indexes of the surrounding media.

In the invention, guides are generally capable of confining light in the two directions transverse to the direction of propagation of light.

To simplify the description, we will consider that the guide consists of its central part or core. Furthermore, all or part of the surrounding media will be called the substrate, it being understood that when the guide is not buried or is only slightly buried, one of the surrounding media may be external to the substrate and may for example be air.

The substrate may be a single layer or multilayer, depending on the type of technique used.

Moreover, an optical guide in a substrate may be more or less buried in this substrate and in particular may comprise portions of guide buried at different depths. This is particularly true in the ion exchange in glass technology.

In FIG. 1, the pump source 2 of the pump device is directly connected to the input of the divider channel 3, by transferring the source 2 onto the substrate 9 for example by gluing.

Figure 4:
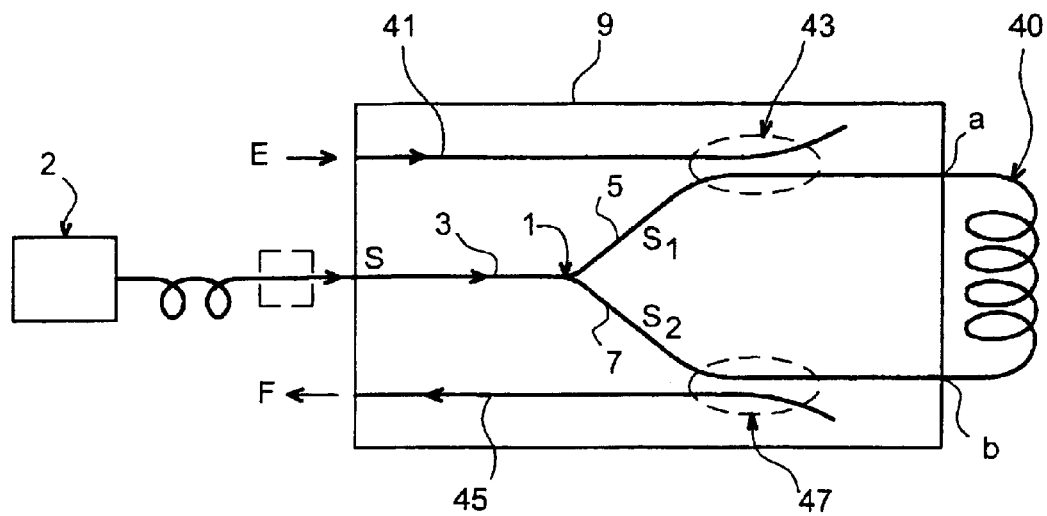

In the case of a fibred pump source, the source is then connected as can be seen in FIG. 4, to the input channel 3 of the divider by a fibre held in contact with the substrate 9 either by a ring or by a "V" block.

The divider shown in FIG. 1 is a Y-junction reference 1.

The pump wave S emitted by the source 2 is transported by the input channel 3, and is then divided into two waves $S_1$ and $S_2$ by the divider 1; these two waves are then transported by channels 5 and 7 respectively. These two waves $S_1$ and $S_2$ may have the same power if the divider is symmetric, or they may have different powers if the divider is asymmetric.

When the divider is required to have more than two outputs, then couplers or Y junctions have to be cascaded in order to obtain n output channels capable of transporting n pump waves $S_i$ where i varies from 1 to n.

Figure 2:
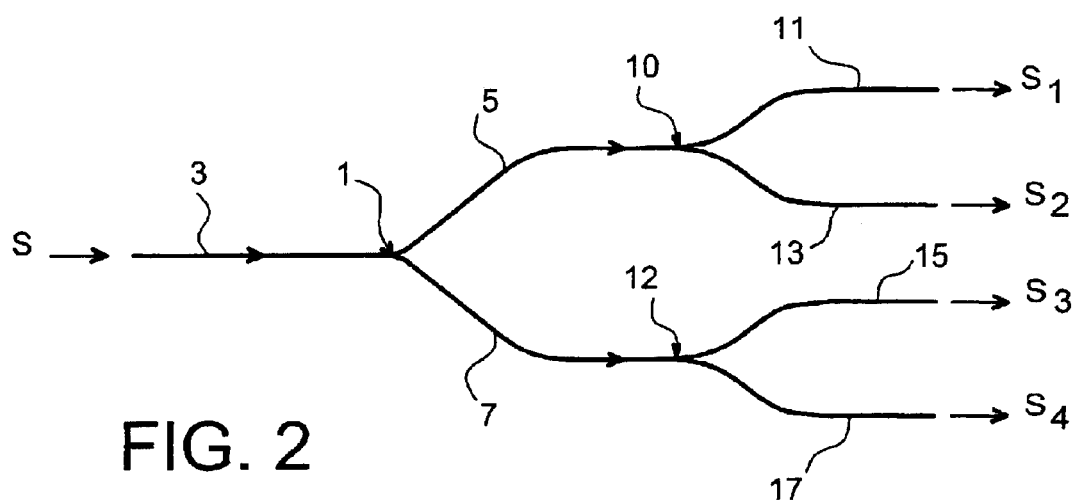
FIG. 2 shows a first variant embodiment of a divider that can be used in the invention.

FIG. 2 shows a divider that can be used in the pump device according to the invention with four output channels for 1 input channel.

For simplification purposes, the divider is shown alone without substrate.

This divider comprises three Y junctions; a first Y junction reference 1 connected firstly to the input channel 3 and secondly to two output channels 5 and 7.

Channel 5 forms the input to a new Y junction reference 10 and channel 7 forms the input to a new Y junction reference 12. The junction 10 has two new output channels 11 and 13 and junction 12 also has two new output channels 15 and 17. Thus, four output channels can be obtained by cascading three Y junctions.

The pump wave S introduced into the input channel 3 is divided a first time by junction 1 and then once again in junctions 10 and 12. The pump device in FIG. 2 can be used to obtain four channels 11, 13, 15 and 17 at the output from the pump waves $S_1$, $S_2$, $S_3$ and $S_4$ respectively.

Figure 3:
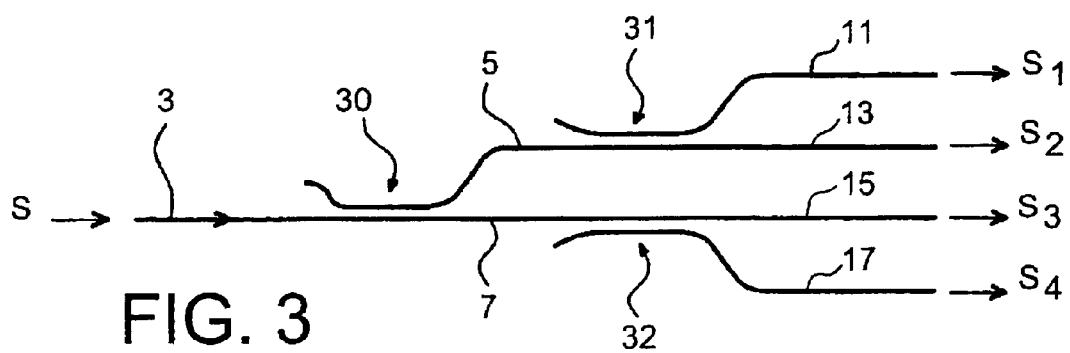
FIG. 3 shows a second variant embodiment of a divider that can be used in the invention, FIG. 4 diagrammatically shows a pump device according to the invention used in an amplification device with one amplifier, FIG. 5 diagrammatically illustrates an example of a pump source that can be used in a pump device according to the invention, FIG. 6 diagrammatically shows a pump device according to the invention used in an amplification device comprising a matrix of optical amplifiers, and FIG. 7 diagrammatically shows another example of a pump device according to the invention used with a matrix of optical amplifiers.

FIG. 3 shows a variant embodiment of a divider with four output channels that can be used in the pump device according to the invention.

This divider uses cascaded couplers, and it can be made equally well in integrated optics by guides in a substrate (not shown), or by optical fibres (each coupler then being made by local fusion of two fibres).

More precisely, the divider shown in this example comprises three cascaded couplers.

A first coupler reference 30 is formed by channels 5 and 7 that, on a given interaction length, are separated by a distance such that part of the light wave S transported by the input channel 3 passes into the output channel 5 while the remainder of the wave is transported by channel 7 that is a prolongation of channel 3. Therefore, there are two channels 5 and 7 at the output from the first coupler 30. Channel 5 then becomes the input channel for the second coupler 31 and channel 7 becomes the input channel for the third coupler 32. These couplers are made as described above by bringing two channels towards each other; 11 and 13 for coupler 31 and 15 and 17 for coupler 32. Channel 13 is the extension of channel 5 and channel 15 is the extension of channel 7.

The part of the wave along which channel 5 passes is divided by coupler 31, so that pump waves $S_1$ and $S_2$ are obtained at the output from the coupler 31 on channels 11 and 13 respectively. Similarly, the part of the wave along which channel 7 passes is divided by coupler 32, so that pump waves $S_3$ and $S_4$ are obtained at the output from the coupler 32 on channels 15 and 17 respectively.

FIG. 4 illustrates a pump device according to the invention used in an amplification device with an optical amplifier.

This optical amplification device comprises:

a pump device for example comprising a fibred pump source 2, optically connected to an optical divider made in integrated optics in a substrate 9, and comprising an input channel 3 capable of transporting the pump wave S output from this source 2 and two output channels 5 and 7 each capable of transporting part of the pump wave (channel 5 transports part of the wave reference $S_1$ and channel 7 transports the other part of the wave reference $S_2$), an optical fibre of the amplifying fibre type 40, this amplifier comprising a first end a optically connected to channel 5 and a second end b optically connected to channel 7; the first end of the amplifying fibre also being connected to an input device for a signal E to be amplified and the second end of the amplifier also being connected to a device for retrieving the amplified signal F.

In this example, the signal insertion device E to be amplified is made from the same substrate as the pump device and comprises a first optical guide 41 and a first coupler 43. This coupler is formed by bringing the first optical guide and the output channel 5 from the pump device together, the output from the coupler being made by prolonging the channel 5 that then transports the signal E and the pump wave $S_i$ to the input a of the amplifier.

Thus, in this embodiment, the amplifier input is connected to the input device for the signal E to be amplified through one of the output channels from the pump wave.

The device for retrieving the signal F advantageously comprises a second optical guide 45 and a second coupler 47, in this example also formed in the same substrate as the pump device, the said coupler being formed by bringing the second optical guide and one of the output channels 7 of the pump device together; the coupler input for the amplified signal F is made by channel 7 that then transports the wave F in the direction opposite to the direction of the pump wave $S_2$ (channel 7 being connected to the end b of the amplifier that outputs the signal F).

In this embodiment, the amplified signal F comes out of the amplifier and is transmitted through the output channel 7 of the pump wave $S_2$ to the second coupler. The second coupler can transmit this amplified signal F to the guide 45. But in this mode, the amplifier output b is connected to the device for retrieving the amplified signal F through the output channel 7 of the pump device.

The signal E is input into the guide 41 by any known means and for example by a standard telecommunication network fibre for optical telecommunications.

The signal F is retrieved at the output from the guide 45 by any known means and for example also by a standard telecommunication network fibre in optical telecommunication.

More generally, these means for inputting the signal E and for retrieving the signal F are optically connected to guides 41 or 45 either by optical fibres through connection means such as "v" blocks of ferules, or directly by transferring the said means on the substrate, or through a free space.

For example, it might be decided to use a wave with power of 120 mW and wavelength 980 nm for wave S, with a symmetric divider 1 capable of outputting firstly a pump wave $S_1$ with a power of about 60 mW and a wavelength of 980 nm and secondly a pump wave $S_2$ also with a power of about 60 mW and a wavelength of 980 nm.

For example, the input wave E may for example have a power of −15 dBm and a wavelength of 1550 nm, and the retrieved wave F may have a power of 15 dBm and a wavelength of 1550 nm for an amplifying fibre 40 doped with erbium about 5 to 10 m long.

Figure 5:
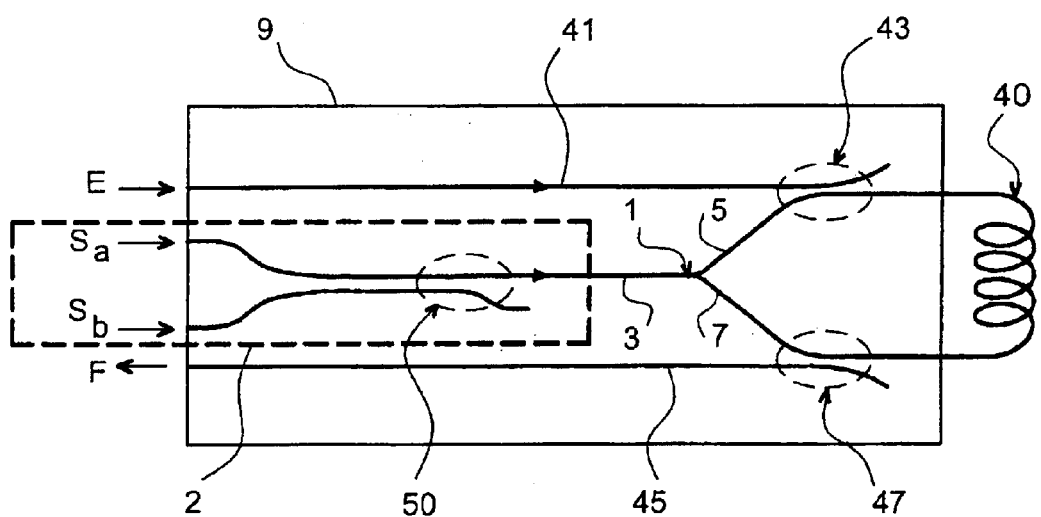

FIG. 5 shows an example of a pump source 2 comprising two sub-sources in an amplification device of the same type as that shown in FIG. 4.

In this example, the pump source 2 can emit a pump wave S at two different wavelengths. To achieve this, it is provided with a sub-source capable of emitting a wave $S_a$ at a given wavelength $\lambda_a$, for example 980 nm, and another sub-source capable of emitting a wave $S_b$ at another wavelength $\lambda_b$, for example 1480 nm, the different sub-sources being optically connected by any known means to a multiplexing device 50 (for example a coupler) capable of transmitting a pump wave S comprising the said wavelengths $\lambda_a$ and $\lambda_b$, to the input channel 3 of the pump device according to the invention.

Thus, the different sub-sources and the associated multiplexing device form a single source.

In this example embodiment, the multiplexing device of the pump source and its input channels are integrated in the same substrate as the divider, the sub-sources being transferred onto the said substrate or connected to the multiplexing device through optical fibres.

Figure 6:
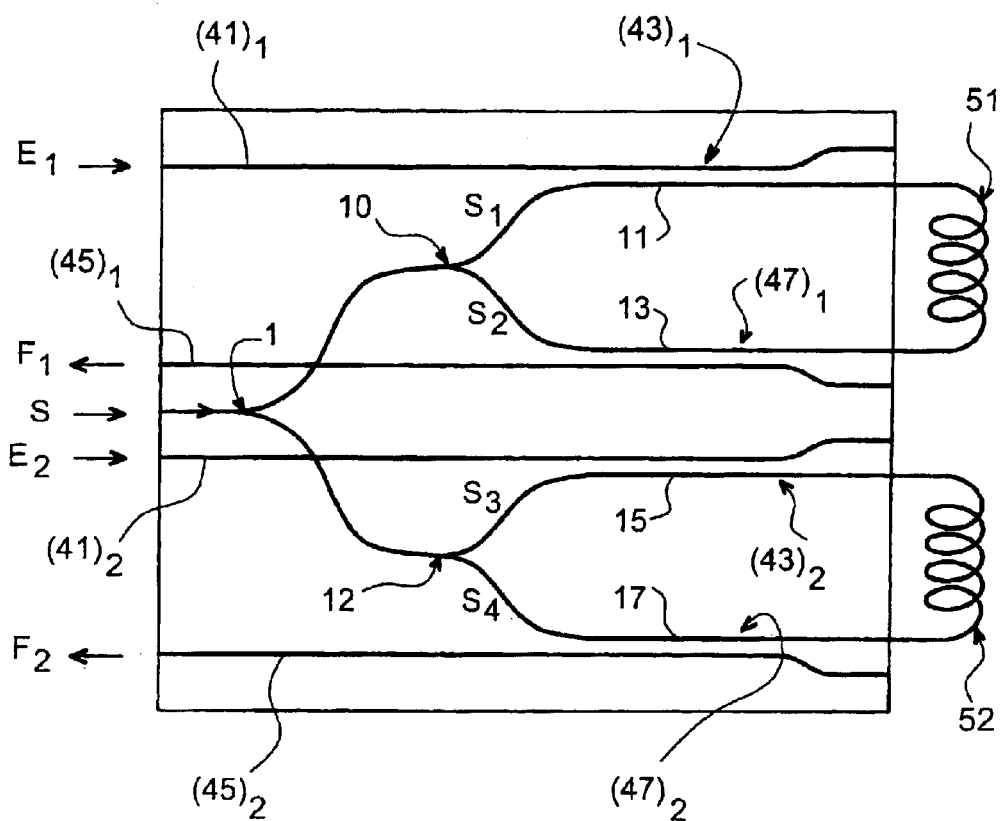

FIG. 6 diagrammatically illustrates a pump device according to the invention used in a matrix amplification device with two optical amplifiers, as an example.

In this example embodiment, each amplifier uses two pump waves travelling in opposite directions, and consequently the pump device must comprise four outputs for two amplifiers references 51 and 52.

This pump device is of the type shown in FIG. 2. It comprises three Y junctions references 1, 10 and 12 in cascade, one input channel 3 into which the pump wave 5 can be input, and four output channels 11, 13, 15 and 17 carrying the pump waves $S_1$, $S_2$, $S_3$ and $S_4$ respectively.

Each amplifier is associated with an input device for the signal to be amplified and a device for retrieving the amplified signal that may for example be of the same type as that shown in FIG. 4 and that are marked with the same references with subscript 1 for amplifier 51 and subscript 2 for amplifier 52.

Thus, the guide $(41)_1$ carrying the signal $E_1$ to the amplifier is coupled by the coupler $(43)_1$ to the output channel 11 carrying the pump wave $S_1$; the output channel 13 transporting the pump wave $S_2$ and the amplified signal $F_1$ in the direction opposite to $S_2$ is coupled by coupler $(47)_1$ to the guide $(45)_1$ so that this guide can receive the signal $F_1$; the guide $(41)_2$ carrying the signal $E_2$ to be amplified is coupled by the coupler $(43)_2$ to the output channel 15 carrying the pump wave $S_3$; and finally the output channel 17 carrying the pump wave $S_4$ and the amplified signal $F_2$ in the direction opposite to $S_4$, is coupled by the coupler $(47)_2$ to the guide $(45)_2$ so that this guide will receive the signal $F_2$.

Figure 7:
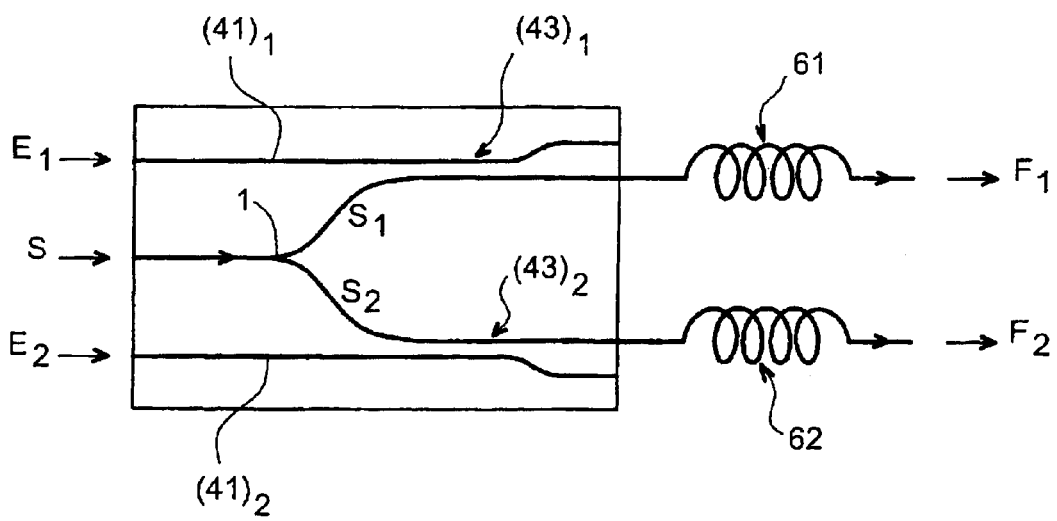

FIG. 7 diagrammatically shows another pump device according to the invention used in a matrix amplification device also with two optical amplifiers.

This example shows two amplifiers 61, 62, for example also of the amplifying fibre type, each using only one pump wave. Therefore, the pump device used in this example for this application only comprises two output channels capable of outputting pump waves $S_1$, $S_2$, from the wave S introduced to the input of the device, using a single divider 1.

As in the previous examples, each amplifier 61 and 62 is associated with an input device for the signal $E_1$ and $E_2$ respectively to be amplified and with a device for retrieving the amplified signal $F_1$ and $F_2$ respectively. In this example, only input devices are made in the same substrate as the pump device and are of the same type as those described above; the retrieval devices are not integrated, they are formed by the ends of the amplifying fibres from which the signals $F_1$, $F_2$ are output.

The previous figures illustrate the use of a pump device made in integrated optics with one or more non-integrated amplifiers, but obviously the invention is applicable to the use of a pump device made in integrated optics or otherwise with an amplifier or a matrix of amplifiers made in integrated optics or otherwise. If the pump device and the amplifiers are made in integrated optics, they may be made on independent supports, and possibly transferred together or on the same support.

What is claimed is:

1. An optical pump device comprising:

a pump source optically connected to an optical divider comprising one input channel and n output channels, the input channel configured to receive a pump wave S derived from the source and the n output channels configured to output n pump waves S1, S2, . . . , Sn, where n is an integer greater than 1, the optical divider being integrated in a substrate, the input channel being an input guide, the n output channels being formed by n output guides, the input guide being connected to the n output guides by at least one optical element, the pump device configured to be connected to at least one optical amplification device.

2. An optical amplification device using a pump device according to claim 1 and at least one optical amplification device connected to the pump device, connected to an input device of a signal to be amplified, and connected to a device for retrieving the amplified signal.

3. An optical amplification device according to claim 2, comprising:

an optical pump device comprising a pump source optically connected to an optical divider comprising an input channel and n output channels, a matrix of amplifiers with at least n/2 optical amplifiers, each amplifier comprising first and second ends, at least one of the first and second ends being optically connected to one of the output channels from the pump device, one of the first and second ends of the amplifier also being connected to a device for inputting a signal to be amplified and the other of the first and second ends of the amplifier being connected to a device for retrieving the amplified signal.

4. An optical amplification device according to claim 3, comprising a pump device with n output channels and n optical amplifiers, one of the first and second ends of each amplifier being connected to one of the output channels from the pump device and to a device for inputting a signal to be amplified, and the other of the first and second ends of the amplifier being connected to a device for retrieving an amplified signal.

5. An optical amplification device according to claim 3, comprising a pump device with n output channels and n/2 optical amplifiers, one of the first and second ends of each amplifier being connected to one of the output channels from the pump device and to a device for inputting a signal to be amplified, and the other of the first and second ends of the amplifier being connected to another output channel from the pump device and to a device for retrieving an amplified signal.

6. An optical amplification device according to claim 2, wherein the pump device is integrated in a substrate, the device for inputting the signal to be amplified is at least partly integrated into the substrate and comprises a first optical guide and a first coupler, the first coupler being formed by bringing the first optical guide and one of the output channels from the pump device together.

7. An optical amplification device according to claim 6, wherein the pump device is integrated in a substrate, the device for retrieving the amplified signal is at least partly integrated in the substrate and comprises a second optical guide and a second coupler, the second coupler being formed by bringing the second optical guide and one of the output channels of the pump device together.

8. An optical amplification device according to claim 2, wherein the optical amplification device is chosen from among a fiber amplifier or an amplifier in integrated optics.

9. An optical amplification device according to claim 2, comprising:
an optical pump device comprising a pump source optically connected to an optical divider comprising one input channel and two output channels,
an optical amplifier comprising an input connected firstly to one of the output channels of the pump device and secondly to the device used to input the signal to be amplified, and an output connected firstly to another output channel from the pump device, and secondly to the device for retrieving the amplified signal.

10. An optical pump device according to claim 1, wherein the pump source emits the pump wave S at at least one wavelength.

11. An optical pump device according to claim 10, wherein the pump source comprises m sub-sources connected to a multiplexing device configured to output the pump wave S at m wavelengths.

12. An optical pump device according to claim 1, wherein the optical element is chosen from among an optical coupler or a Y junction.

13. An optical pump device according to claim 1, wherein when n is greater than 2, the divider comprises more than two optical elements cascaded to obtain the n output channels.

* * * * *